United States Patent
Rangaraju et al.

(10) Patent No.: US 12,405,653 B2
(45) Date of Patent: Sep. 2, 2025

(54) PROVIDING RUNTIME POWER PROFILE TUNING BASED ON EYE STATE IN PROCESSOR-BASED EXTENDED REALITY (XR) DEVICES

(71) Applicant: QUALCOMM Incorporated, San Diego, CA (US)

(72) Inventors: Karthik Rangaraju, Hyderabad (IN); Nirav Narendra Desai, Hyderabad (IN); Udayakumar Menon, San Diego, CA (US); Shruti Hanumanthaiah, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 350 days.

(21) Appl. No.: 17/934,641

(22) Filed: Sep. 23, 2022

(65) Prior Publication Data

US 2024/0103596 A1 Mar. 28, 2024

(51) Int. Cl.
*G06F 1/26* (2006.01)
*G06F 1/3231* (2019.01)
*G06F 1/3203* (2019.01)

(52) U.S. Cl.
CPC .......... *G06F 1/3231* (2013.01); *G06F 1/3203* (2013.01)

(58) Field of Classification Search
CPC .... G06F 1/3231; G06F 1/3215; G06F 1/3265; G06F 3/013; G06F 3/017; G06F 1/163
USPC .......................................................... 713/320
See application file for complete search history.

(56) References Cited

U.S. PATENT DOCUMENTS

| | | | |
|---|---|---|---|
| 10,698,479 B2* | 6/2020 | Fan | A61B 3/113 |
| 10,921,883 B2* | 2/2021 | Onyekwelu | G06F 3/013 |
| 2012/0320334 A1* | 12/2012 | Ho | G02C 7/044 351/159.23 |
| 2015/0039922 A1* | 2/2015 | Chalhoub | G06F 1/3296 713/323 |
| 2017/0039045 A1* | 2/2017 | Abrahami | A61B 5/486 |
| 2017/0178408 A1 | 6/2017 | Bavor, Jr. et al. | |
| 2017/0188823 A1* | 7/2017 | Ganesan | A61B 3/113 |
| 2017/0255259 A1* | 9/2017 | Mor | G06F 1/3265 |

(Continued)

OTHER PUBLICATIONS

International Search Report and Written Opinion for International Patent Application No. PCT/US2023/071423, mailed Nov. 7, 2023, 17 pages.

(Continued)

*Primary Examiner* — Volvick Derose
(74) *Attorney, Agent, or Firm* — Withrow & Terranova, PLLC

(57) ABSTRACT

Providing runtime power profile tuning based on eye state in processor-based Extended Reality (XR) devices is disclosed herein. In this regard, in some exemplary aspects, a processor of a processor-based XR device is configured to apply a default power profile, and detect, using an eye blink detection circuit, an eye close event of a user of the processor-based XR device. In response to detecting the eye close event, the processor selects a test power profile from a plurality of power profiles and applies the test power profile. The processor then measures an operating characteristic of the processor-based XR device and compares the operating characteristic with a corresponding reference range. Based on the comparing, the processor updates one or more power profiles of the plurality of power profiles.

30 Claims, 8 Drawing Sheets

(56) References Cited

U.S. PATENT DOCUMENTS

| | | | |
|---|---|---|---|
| 2018/0329465 A1* | 11/2018 | Tavakoli | G06F 1/3234 |
| 2019/0163250 A1* | 5/2019 | Lee | G06F 11/3062 |
| 2020/0019238 A1 | 1/2020 | Agaoglu et al. | |
| 2020/0060810 A1* | 2/2020 | Toner | G02C 7/027 |
| 2020/0073122 A1* | 3/2020 | Rothkopf | G02B 27/017 |
| 2020/0073465 A1* | 3/2020 | Nikhara | G06F 1/324 |
| 2022/0000362 A1* | 1/2022 | Scheller | A61B 3/005 |
| 2022/0083121 A1 | 3/2022 | Khosrowpour et al. | |
| 2024/0139511 A1* | 5/2024 | Rangaraju | A61B 5/6803 |

OTHER PUBLICATIONS

Benedetto, S. et al., "Driver workload and eye blink duration," Transportation Research Part F: Traffic Psychology and Behaviour, vol. 14, No. 3, May 2011, pp. 199-208.

Briggs, "How Long Is A "Blink of an Eye" Astronomically?" Jul. 2, 2017, available on the Internet: [URL: https://www.wmbriggs.com/post/1750/], 7 pages.

Wascher, E. et al., "Eye-blinks in choice response tasks uncover hidden aspects of information processing," EXCLI Journal, vol. 14, Nov. 2015, 12 pages.

\* cited by examiner

PROVIDING RUNTIME POWER PROFILE TUNING BASED ON EYE STATE IN PROCESSOR-BASED EXTENDED REALITY (XR) DEVICES

BACKGROUND

I. Field of the Disclosure

The technology of the disclosure relates generally to power management in processor-based Extended Reality (XR) devices.

II. Background

Extended reality (XR), as used herein, is an umbrella term that refers to computer-generated environments and interactions that range from an immersive virtual environments of a virtual reality (VR) application to a combination of real-world elements and virtual elements provided by augmented reality (AR) and mixed reality (MR) applications. An XR environment is generated by a processor-based XR device, which may comprise any computing device that provides a processor, a display device (such as a screen, a head-mounted display (HMD), eyeglasses, and/or the like, as non-limiting examples), an input device, and appropriate sensors for detecting position and movement of the computing device, the input device, and/or the HMD (e.g., accelerometers, compasses, positioning systems, and/or the like, as non-limiting examples). Such processor-based XR devices can provide an immersive experience in which a user perceives an entirely virtual, computer-generated environment (in the case of VR), or an environment in which computer-generated digital information or virtual objects are overlaid onto a non-virtual real-world environment (in the case of AR/MR).

Because the processing, sensing, and display functionalities provided by processor-based XR devices tend to be power-intensive, the optimization of power consumption is a challenge faced by most processor-based XR devices. One approach to managing power consumption involves the use of predefined power profiles that specify various system settings, options, and/or attributes that can be modified to optimize power usage in different use cases. Each use case may be associated with one or more specific power profiles, and may correspond to a particular mode of operation of the processor-based XR device (e.g., a full performance mode, a battery-saving mode, and the like), a particular class of application being executed by the processor-based XR device (e.g., a game application or other performance-intensive application), and/or a particular hardware configuration of the processor-based XR device.

However, the use of power profiles may not be sufficient to adequately optimize power consumption by a processor-based XR device. The actual real-time power consumption for a given use case may not be constant, but rather may vary depending on variables such as workload, central processing unit (CPU) usage, cache usage, and/or other resource usage patterns. Power consumption may be further impacted by variations in design and development of third-party applications over different releases, as well as by differences between operating system versions. As a result, the usage of a particular power profile for a given use case over multiple occasions may result in different levels of power consumption, as well as different impacts on device performance and thermal profile, depending on the interactions of these variables. Moreover, testing different power profiles under runtime circumstances may risk negatively impacting the user experience by degrading device performance and/or thermal profile.

Accordingly, a mechanism for more effectively tuning power profiles of processor-based XR devices for different use cases while minimizing impact on user experience is desirable.

SUMMARY OF THE DISCLOSURE

Aspects disclosed in the detailed description include providing runtime power profile tuning based on eye state in processor-based Extended Reality (XR) devices. Related apparatus, methods, and computer-readable media are also disclosed. In this regard, in some exemplary aspects disclosed herein, a processor-based XR device (e.g., using a power profile tuning circuit) is configured to perform power profile testing and tuning during an "eye blink window" (i.e., an interval between detection of the closing of a user's eyes and detection of the subsequent opening of the user's eyes), during which the user will not perceive any performance degradation that may result from power profile tuning. The processor-based XR device begins by applying a default power profile from a plurality of power profiles, based on, e.g., a current use case for the processor-based XR device or an Original Equipment Manufacturer (OEM)/Original Design Manufacturer (ODM)-provided whitelist of power profiles. The processor-based XR device then detects, using an eye blink detection circuit, an eye close event of the user. Upon detecting the eye close event, the processor-based XR device selects a test power profile from the plurality of power profiles and applies the test power profile. The processor-based XR device then measures an operating characteristic (e.g., a power characteristic, a performance characteristic, and/or a temperature characteristic, as non-limiting examples) of the processor-based XR device and compares the operating characteristic with a corresponding reference range (e.g., a reference power range, a reference performance range, and/or a reference temperature range). Based on the comparing, the processor-based XR device updates one or more power profiles of the plurality of power profiles (e.g., to increase or decrease the frequency with which the test power profile will be selected in the future, to indicate that the test power profile should be evaluated further, and/or to select a new default power profile, as non-limiting examples). In this manner, the effects of different power profiles on power consumption, device performance, and thermal profile can be dynamically evaluated and optimized at runtime in a manner that is transparent to the user, resulting in improved battery life and increased device usage time while minimizing impacts on performance and thermal profile.

In some aspects, the processor-based XR device subsequently detects an eye open event of the user (indicating the end of the eye blink window), and, in response, reverts to the default power profile. Some aspects may provide that the processor-based XR device may measure a performance characteristic (e.g., motion-to-photon (M2P) latency, motion-to-render-to-photon (M2R2P) latency, frames per second (FPS), jank, six-degrees-of-freedom (6DOF)/perception drift, and/or network throughput, as non-limiting examples), and compare the performance characteristic to a reference performance range. If the performance characteristic is within the reference performance range, the processor-based XR device may then measure a power characteristic (e.g., average milliwatts (mW) consumed, as a non-limiting example), and compare the power characteristic to a reference power range. If the power characteristic is within the reference power range, the processor-based device updates the test power profile to indicate that evaluation of the test power profile should continue during a subsequent eye blink window. According to some aspects, if the processor-based XR device determines that the test power profile has been evaluated over multiple eye blink windows and indicates one of a performance improvement and a power improvement over the default power profile, the processor-based XR device may designate the test power profile as the default power profile.

Some aspects may provide that the processor-based XR device may measure a temperature characteristic (e.g., junction temperature ($T_j$) and/or skin temperature ($T_{skin}$), as non-limiting examples) of the processor-based XR device and compare the temperature characteristic to a reference temperature range. If the temperature characteristic is within the reference temperature range, the processor-based device updates the test temperature profile to provide feedback for selecting the test power profile more frequently in the future. However, if the temperature characteristic is not within the reference temperature range, the processor-based XR device updates the test power profile to provide feedback for selecting the test power profile less frequently in the future, and also selects and applies a new power profile without waiting for an eye open event.

In another aspect, a processor-based XR device is provided. The processor-based XR device comprises a processor, and an eye blink detection circuit communicatively coupled to the processor. The processor is configured to apply a default power profile. The processor is further configured to detect, using the eye blink detection circuit, an eye close event of a user of the processor-based XR device. The processor is also configured to, responsive to detecting the eye close event, select a test power profile from a plurality of power profiles, and apply the test power profile. The processor is additionally configured to measure an operating characteristic of the processor-based XR device. The processor is further configured to compare the operating characteristic with a corresponding reference range. The processor is also configured to update one or more power profiles of the plurality of power profiles based on the comparing.

In another aspect, a processor-based XR device is provided. The processor-based XR device comprises means for applying a default power profile. The processor-based XR device further comprises means for detecting an eye close event of a user of the processor-based XR device. The processor-based XR device also comprises means for selecting a test power profile from a plurality of power profiles, responsive to detecting the eye close event. The processor-based XR device additionally comprises means for applying the test power profile. The processor-based XR device further comprises means for measuring an operating characteristic of the processor-based XR device. The processor-based XR device also comprises means for comparing the operating characteristic with a corresponding reference range. The processor-based XR device additionally comprises means for updating one or more power profiles of the plurality of power profiles based on the comparing.

In another aspect, a method for providing runtime power profile tuning based on eye state in processor-based XR devices is provided. The method comprises applying, by a power profile tuning circuit of a processor-based XR device, a default power profile. The method further comprises detecting, using an eye blink detection circuit of the processor-based XR device, an eye close event of a user of the processor-based XR device. The method also comprises, responsive to detecting the eye close event, selecting a test power profile from a plurality of power profiles, and applying the test power profile. The method additionally comprises measuring an operating characteristic of the processor-based XR device. The method further comprises comparing the operating characteristic with a corresponding reference range. The method also comprises updating one or more power profiles of the plurality of power profiles based on the comparing.

In another aspect, a non-transitory computer-readable medium is provided. The non-transitory computer-readable medium stores thereon computer-executable instructions that, when executed by a processor of a processor-based XR device, cause the processor to apply a default power profile. The computer-executable instructions further cause the processor to detect an eye close event of a user of the processor-based XR device. The computer-executable instructions also cause the processor to, responsive to detecting the eye close event, select a test power profile from a plurality of power profiles, and apply the test power profile. The computer-executable instructions additionally cause the processor to measure an operating characteristic of the processor-based XR device. The computer-executable instructions further cause the processor to compare the operating characteristic with a corresponding reference range. The computer-executable instructions also cause the processor to update one or more power profiles of the plurality of power profiles based on the comparing.

DETAILED DESCRIPTION

Figure 1:
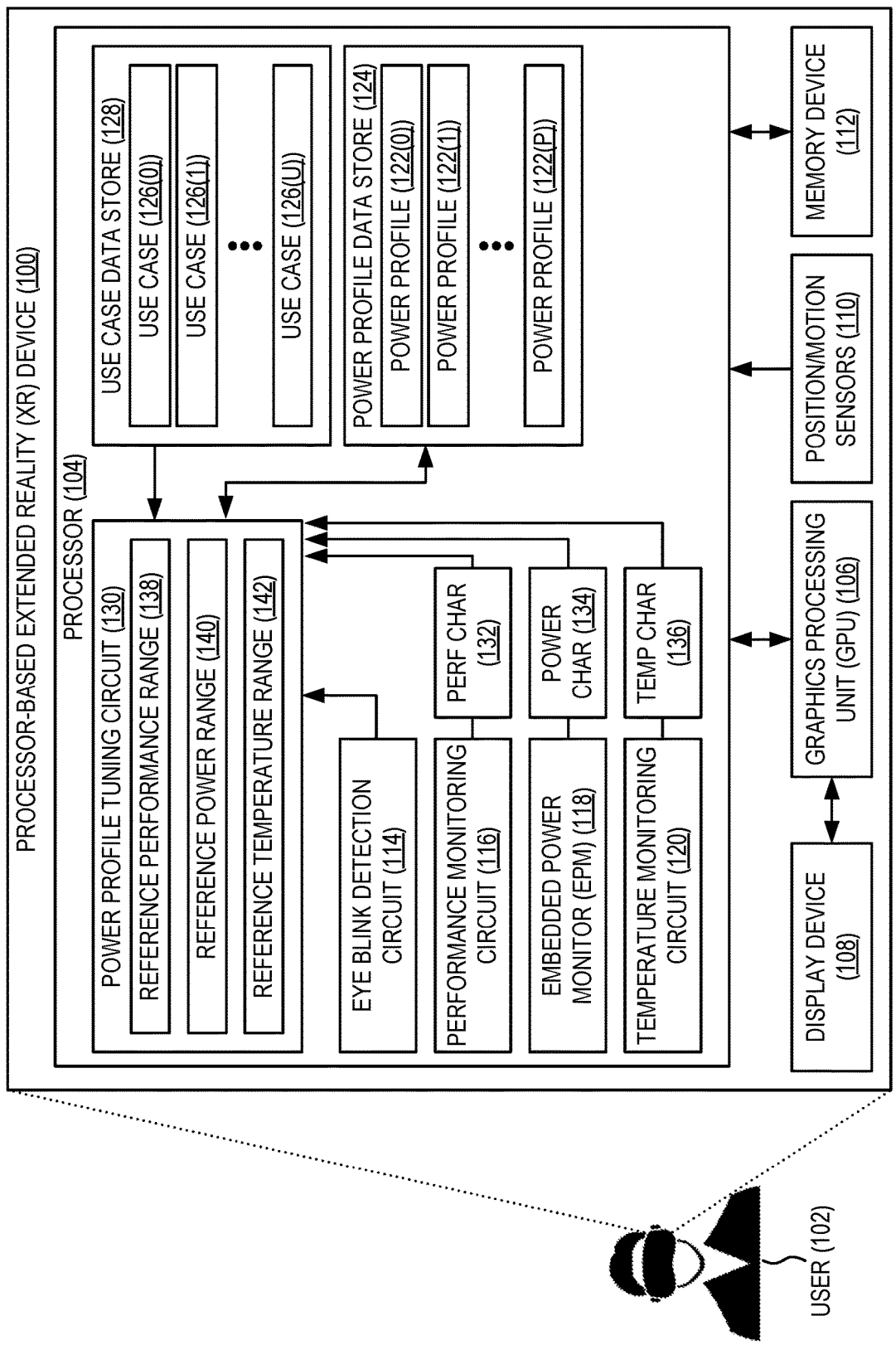
FIG. 1 is a block diagram of an exemplary processor-based Extended Reality (XR) device configured to provide runtime power profile tuning based on eye state, according to some aspects.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include providing runtime power profile tuning based on eye state in processor-based Extended Reality (XR) devices. Related apparatus, methods, and computer-readable media are also disclosed. In this regard, in some exemplary aspects disclosed herein, a processor-based XR device (e.g., using a power profile tuning circuit) is configured to perform power profile testing and tuning during an "eye blink window" (i.e., an interval between detection of the closing of a user's eyes and detection of the subsequent opening of the user's eyes), during which the user will not perceive any performance degradation that may result from power profile tuning. The processor-based XR device begins by applying a default power profile from a plurality of power profiles, based on, e.g., a current use case for the processor-based XR device or an Original Equipment Manufacturer (OEM)/Original Design Manufacturer (ODM)-provided whitelist of power profiles. The processor-based XR device then detects, using an eye blink detection circuit, an eye close event of the user. Upon detecting the eye close event, the processor-based XR device selects a test power profile from the plurality of power profiles and applies the test power profile. The processor-based XR device then measures an operating characteristic (e.g., a power characteristic, a performance characteristic, and/or a temperature characteristic, as non-limiting examples) of the processor-based XR device and compares the operating characteristic with a corresponding reference range (e.g., a reference power range, a reference performance range, and/or a reference temperature range). Based on the comparing, the processor-based XR device updates one or more power profiles of the plurality of power profiles (e.g., to increase or decrease the frequency with which the test power profile will be selected in the future, to indicate that the test power profile should be evaluated further, and/or to select a new default power profile, as non-limiting examples). In this manner, the effects of different power profiles on power consumption, device performance, and thermal profile can be dynamically evaluated and optimized at runtime in a manner that is transparent to the user, resulting in improved battery life and increased device usage time while minimizing impacts on performance and thermal profile.

In some aspects, the processor-based XR device subsequently detects an eye open event of the user (indicating the end of the eye blink window), and, in response, reverts to the default power profile. Some aspects may provide that the processor-based XR device may measure a performance characteristic (e.g., motion-to-photon (M2P) latency, motion-to-render-to-photon (M2R2P) latency, frames per second (FPS), jank, six-degrees-of-freedom (6DOF)/perception drift, and/or network throughput, as non-limiting examples), and compare the performance characteristic to a reference performance range. If the performance characteristic is within the reference performance range, the processor-based XR device may then measure a power characteristic (e.g., average milliwatts (mW) consumed, as a non-limiting example), and compare the power characteristic to a reference power range. If the power characteristic is within the reference power range, the processor-based device updates the test power profile to indicate that evaluation of the test power profile should continue during a subsequent eye blink window. According to some aspects, if the processor-based XR device determines that the test power profile has been evaluated over multiple eye blink windows and indicates one of a performance improvement and a power improvement over the default power profile, the processor-based XR device may designate the test power profile as the default power profile.

Some aspects may provide that the processor-based XR device may measure a temperature characteristic (e.g., junction temperature ($T_j$) and/or skin temperature ($T_{skin}$), as non-limiting examples) of the processor-based XR device and compare the temperature characteristic to a reference temperature range. If the temperature characteristic is within the reference temperature range, the processor-based device updates the test temperature profile to provide feedback for selecting the test power profile more frequently in the future. However, if the temperature characteristic is not within the reference temperature range, the processor-based XR device updates the test power profile to provide feedback for selecting the test power profile less frequently in the future, and also selects and applies a new power profile without waiting for an eye open event.

In this regard, FIG. 1 is a block diagram of an exemplary processor-based XR device 100 that is configured to generate and display an XR environment (e.g., a virtual reality (VR) environment, an augmented reality (AR) environment, and/or a mixed reality (MR) environment) to a user 102, and to update the displayed XR environment in response to input from the user 102 and/or changes in the XR environment. The processor-based XR device 100 comprises a processor 104 (also referred to as a "processor core" or a "central processing unit (CPU) core"), which may be an in-order or an out-of-order processor (OoP) and/or may be one of a plurality of processors 104 provided by the processor-based XR device 100. In the example of FIG. 1, the processor 104 is communicatively coupled to a graphics processing unit (GPU) 106, which is a dedicated processing unit configured to accelerate the rendering of graphics and video data for display by a display device 108. The display device 108 may comprise, e.g., a head-mounted display (HMD), a monitor, eyeglasses, and/or the like. The processor 104 is also communicatively coupled to position/motion sensors 110 that are configured to provide the processor 104 with data regarding the position and motion of the user 102 and/or the processor-based XR device 100. The position/motion sensors 110 may comprise, e.g., accelerometers, compasses, positioning systems, and/or the like, as non-limiting examples. The processor 104 is additionally communicatively coupled to a memory device 112 that provides storage for instructions and data used by the processor 104 when executing an XR application.

The processor-based XR device 100 of FIG. 1 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages. It is to be understood that some aspects of the processor-based XR device 100 may include elements in addition to those illustrated in FIG. 1, and/or may include more or fewer of the elements illustrated in FIG. 1. For example, the processor-based XR device 100 may further include caches, controllers, communications buses, and/or persistent storage devices, which are omitted from FIG. 1 for the sake of clarity.

The processor 104 of the processor-based XR device 100 provides an eye blink detection circuit 114 for monitoring the eye activity of the user 102, including eye close events (i.e., the eyes of the user 102 transition from open to closed, such as when the user 102 begins an eye blink) and eye open events (i.e., the eyes of the user 102 transition from closed to open, as when the user 102 completes an eye blink). The eye blink detection circuit 114 may be based on convention eye tracking solutions such as those provided by Tobii Tech AB. To monitor the internal state of the processor-based XR device 100, the processor 104 also includes a performance monitoring circuit 116, an Embedded Power Monitor (EPM) 118, and a temperature monitoring circuit 120. The performance monitoring circuit 116 is configured to monitor and collect statistics on one or more performance characteristics that may affect the experience of the user 102 when using the processor-based XR device 100, such as motion-to-photon (M2P) latency, motion-to-render-to-photon (M2R2P) latency, frames per second (FPS), jank, six-degrees-of-freedom (6DOF)/perception drift, and/or network throughput, as non-limiting examples. The EPM 118 is configured to provide power measurement for all Power Management Integrated Circuit (PMIC) regulators (not shown) of the processor-based XR device 100 and to subsample each regulator during configurable aperture windows and provide sufficient accuracy for thermal control and system power budgeting by the processor-based XR device 100. The temperature monitoring circuit 120 is configured to monitor and collect statistics for one or more of a junction temperature $T_j$ and a skin temperature $T_{skin}$ of the processor-based XR device 100.

To manage power consumption by the processor-based XR device 100, the processor 104 provides a plurality of predefined power profiles 122(0)-122(P) that are stored in a power profile data store 124, and that are each associated with one or more use cases of a plurality of use cases 126(0)-126(U) stored in a use case data store 128. It is to be understood that, while the use cases 126(0)-126(U) are shown in FIG. 1 as being stored separately from the power profiles 122(0)-122(P), some aspects may provide that the use cases 126(0)-126(U) may be stored along with the power profiles 122(0)-122(P) (e.g., as a use case indicator associated with each entry of the power profile data store 124) rather than stored separately in the use case data store 128. The use case data store 128 and the power profile data store 124 may comprise any appropriate data structure, data base, or lookup table (LUT).

Each of the use cases 126(0)-126(U) may correspond to one or more of a particular mode of operation of the processor-based XR device 100 (such as a full performance mode, a battery-saving mode, and the like, as non-limiting examples), a particular class of application being executed by the processor-based XR device 100 (such as a game application or other performance-intensive application, as non-limiting examples), and/or a particular hardware configuration of the processor-based XR device 100. The power profiles 122(0)-122(P) each specify one or more system settings, options, and/or attributes that can be implemented to optimize power usage in different ones of the use cases 126(0)-126(U). The power profiles 122(0)-122(P) may also include additional information, such as an identifier of a corresponding use case of the use cases 126(0)-126(U), data indicating how frequently or under what conditions the power profiles 122(0)-122(P) should be applied, and/or data indicating whether the power profiles 122(0)-122(P) are being evaluated.

Exemplary power profiles are shown below in Table 1:

TABLE 1

| Power Profile | System Setting/Option/Attribute Modified |
| --- | --- |
| Scale Down | System clock or specified subsystem is scaled down |
| Skip Frames | Skip processing of one or more frames of XR content |
| Foveation Level | Increase foveation region(s) scale from peripheral for certain frames |
| Resolution Scaler | Lower rendering resolution |

TABLE 1-continued

| Power Profile | System Setting/Option/Attribute Modified |
| --- | --- |
| System Memory Collapsible | Portion of printed circuit board (PCB)/bank/segment of cache or memory is collapsible |
| Collapse or Pause Hardware Activity | Collapse or pause certain hardware activity, such as camera |
| CPU tuning | Modify scheduler or frequency of CPU |
| Prefetcher configuration | Modifyf prefetcher setting, such as settings for Level 1 (L1) cache, Level 2 (L2) cache, or Level 3 (L3) cache prefetcher |
| DDR Idle Time | Idle Power Down Count (IPDC) stats for memory |
| Workload | Move workload from a higher power processor or functional unit to lower power processor or functional unit |

However, as noted above, the use of power profiles such as the power profiles 122(0)-122(P) of FIG. 1 may not be sufficient to adequately optimize power consumption by the processor-based XR device 100, due to variations in workload, CPU usage, and cache usage at runtime, as well as the design and development of third-party applications over different releases and differences between operating system versions. Consequently, the usage of a particular power profile 122(0)-122(P) for a given use case 126(0)-126(U) over multiple occasions may result in different levels of power consumption, as well as different impacts on device performance and thermal profile, depending on the interactions of these variables.

In this regard, the processor-based XR device 100 provides a power profile tuning circuit 130 that is configured to perform power profile testing and tuning based on an eye state of the user 102. In particular, the power profile tuning circuit 130 performs power profile tuning during an "eye blink window" (i.e., an interval between detection of the closing of a user's eyes and detection of the subsequent opening of the user's eyes). Because performance degradation that may result from the power profile tuning circuit 130 performing tuning operations during an eye blink window will not be perceived by the user 102, power profile tuning can be performed at runtime, and thus can better account for the variations noted above.

In exemplary operation, the power profile tuning circuit 130 in some aspects selects one of the power profiles 122(0)-122(P) as a default power profile, based on, e.g., a use case of the plurality of use cases 126(0)-126(U) and/or a whitelist provided by an OEM/ODM. In the example of FIG. 1, assume for the sake of illustration that the power profile 122(0) is selected as the default power profile. The power profile tuning circuit 130 may then apply the default power profile 122(0) (i.e., by setting the system settings, options, and/or attributes to those indicated by the default power profile 122(0)).

Subsequently, the power profile tuning circuit 130 performs power profile tuning by using the eye blink detection circuit 114 to detect an eye close event of the user 102. In response to the eye close event, the power profile tuning circuit 130 selects a test power profile, such as the power profile 122(1), from the plurality of power profiles 122(0)-122(P). The power profile tuning circuit 130 then applies the test power profile 122(1) (i.e., by changing the system settings, options, and/or attributes from those indicated by the default power profile 122(0) to those indicated by the test power profile 122(1)). The power profile tuning circuit 130 then measures an operating characteristic of the processor-based XR device 100 while it operates under the test power profile 122(1). The operating characteristic may comprise a performance characteristic (captioned as "PERF CHAR" in FIG. 1) 132 measured by the performance monitoring circuit 116, a power characteristic (captioned as "POWER CHAR" in FIG. 1) 134 measured by the EPM 118, and/or a temperature characteristic (captioned as "TEMP CHAR" in FIG. 1) 136 measured by the temperature monitoring circuit 120.

The power profile tuning circuit 130 next compares the operating characteristic with a corresponding reference range. The reference range specifies an acceptable range of values for the operating characteristic, and may comprise a reference performance range 138, a reference power range 140, and/or a reference temperature range 142 maintained by the power profile tuning circuit 130. The power profile tuning circuit 130 then updates one or more power profiles of the plurality of power profiles 122(0)-122(P) based on the comparing. As discussed in greater detail below, updating a power profile may comprise providing information regarding how frequently the test power profile 122(1) is to be applied in the future, information regarding whether the test power profile 122(1) is currently under evaluation, and/or providing other information for guiding future selection of the test power profile 122(1). In some aspects, the power profile tuning circuit 130 subsequently uses the eye blink detection circuit 114 to detect an eye open event of the user 102, and, in response, reverts to the default power profile 122(0).

According to some aspects, the specific operations for performing power profile tuning may include the power profile tuning circuit 130 measuring the performance characteristic 132 and comparing the performance characteristic 132 with the reference performance range 138. If the performance characteristic 132 is not within the reference performance range 138, the power profile tuning circuit 130 reverts to the default power profile 122(0). However, if the power profile tuning circuit 130 determines that the performance characteristic 132 is within the reference performance range 138, the power profile tuning circuit 130 next measures the power characteristic 134 and compares the power characteristic 134 with the reference power range 140. If the power characteristic 134 is not within the reference power range 140, the power profile tuning circuit 130 reverts to the default power profile 122(0). If the power profile tuning circuit 130 determines that the power characteristic 134 is within the reference power range 140, though, the power profile tuning circuit 130 updates the test power profile 122(1) to indicate that evaluation of the test power profile 122(1) should continue during a subsequent eye blink window. Subsequently, after a number of eye blink windows have elapsed, the power profile tuning circuit 130 according to some aspects may determine whether the test power profile 122(1) has been evaluated over multiple eye blink windows, and further whether the test power profile 122(1) indicates a performance improvement and/or a power improvement over the default power profile 122(0). If so, the power profile tuning circuit 130 designates the test power profile 122(1) as the default power profile 122(0).

In some aspects, the specific operations for performing power profile tuning may include the power profile tuning circuit 130 measuring the temperature characteristic 136 (e.g., a junction temperature $T_j$ and/or a skin temperature $T_{skin}$ of the processor-based XR device 100) and comparing the temperature characteristic 136 with the reference temperature range 142. If the temperature characteristic 136 is within the reference temperature range 142, the power profile tuning circuit 130 updates the test power profile 122(1) to provide feedback for selecting the test power profile 122(1) more frequently in the future. However, if the power profile tuning circuit 130 determines that the temperature characteristic 136 is not within the reference temperature range 142, the power profile tuning circuit 130 may update the test power profile 122(1) to provide feedback for selecting the test power profile 122(1) less frequently in the future. The power profile tuning circuit 130 may also select a new power profile, such as the power profile 122(P), from the plurality of power profiles 122(0)-122(P) and may apply the new power profile 122(P) without waiting for an eye open event.

Some aspects may provide that, prior to beginning power profile tuning, the power profile tuning circuit 130 first measures an initial operating characteristic (e.g., an initial performance characteristic such as the performance characteristic 132, an initial power characteristic such as the power characteristic 134, and/or an initial temperature characteristic such as the temperature characteristic 136) of the processor-based XR device 100 while the processor-based XR device 100 is operating using the default power profile 122(0). The power profile tuning circuit 130 may then determine whether the initial operating characteristic of the processor-based XR device 100 is within a corresponding reference range (e.g., the reference performance range 138, the reference power range 140, and/or the reference temperature range 142). For example, the power profile tuning circuit 130 may determine whether an average power usage in milliwatts is within a reference milliwatt range, whether a junction temperature $T_j$ is within a reference temperature range, and whether a Key Performance Indicator (KPI) is within a reference performance range. If not, the power profile tuning circuit 130 updates the default power profile 122(0) to provide feedback for selecting the default power profile 122(0) less frequently in the future. The power profile tuning circuit 130 may select a new power profile, such as the power profile 122(P), from the plurality of power profiles 122(0)-122(P). The power profile tuning circuit 130 then applies the new power profile 122(P).

Figure 2:
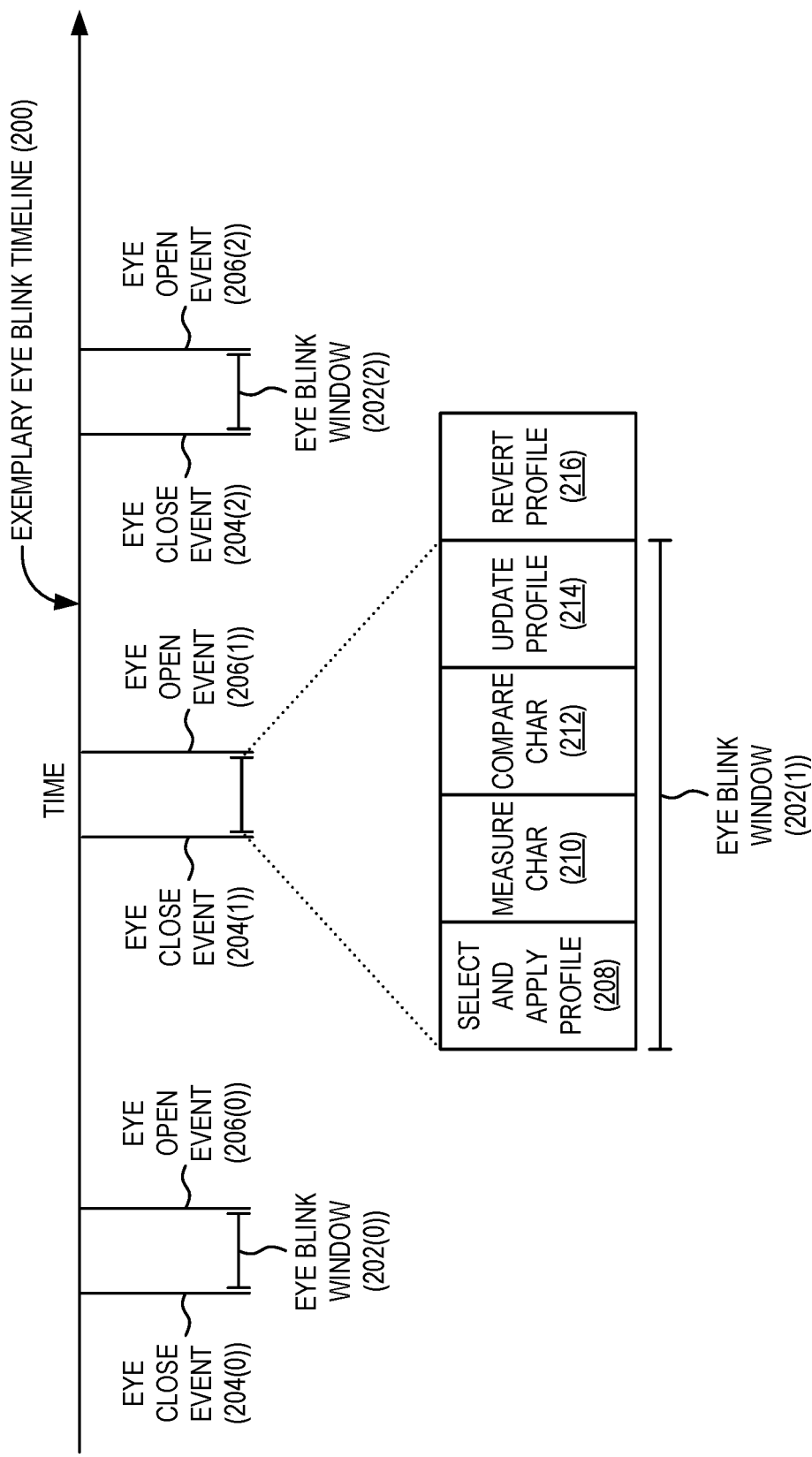
FIG. 2 is a block diagram illustrating an exemplary eye blink timeline showing exemplary operations performed within an eye blink window.

FIG. 2 is a block diagram illustrating an exemplary eye blink timeline 200 along with exemplary operations that may be performed within an eye blink window by the processor-based XR device 100 of FIG. 1. On the eye blink timeline 200, multiple eye blink windows 202(0)-202(2) are shown, with each of the eye blink windows 202(0)-202(2) beginning with a corresponding eye close event 204(0)-204(2) and ending with a corresponding eye open event 206(0)-206(2). Eye blink windows such as the eye blink windows 202(0)-202(2) may occur from six (6) to 30 times per minute on average, with each of the eye blink windows 202(0)-202(2) lasting approximately 300 to 400 milliseconds. As seen in FIG. 2, during the eye blink window 202(1), the power profile tuning circuit 130, upon detecting the eye close event 204(1), may select and apply the test power profile 122(1) as described above and represented by block 208. The power profile tuning circuit 130 then measures an operating characteristic of the processor-based XR device 100 while it operates under the test power profile 122(1), as represented by block 210 (captioned as "MEASURE CHAR" in FIG. 2), and compares the operating characteristic with a corresponding reference range, as represented by block 212 (captioned as "COMPARE CHAR" in FIG. 2). The power profile tuning circuit 130 then updates one or more power profiles of the plurality of power profiles 122(0)-122(P) based on the comparing, as represented by block 214 (captioned as "UPDATE PROFILE" in FIG. 2). Upon detecting the eye open event 206(1), the power profile tuning circuit 130 reverts to the default power profile 122(0), as indicated by block 216 (captioned as "REVERT PROFILE" in FIG. 2).

Figure 3A:
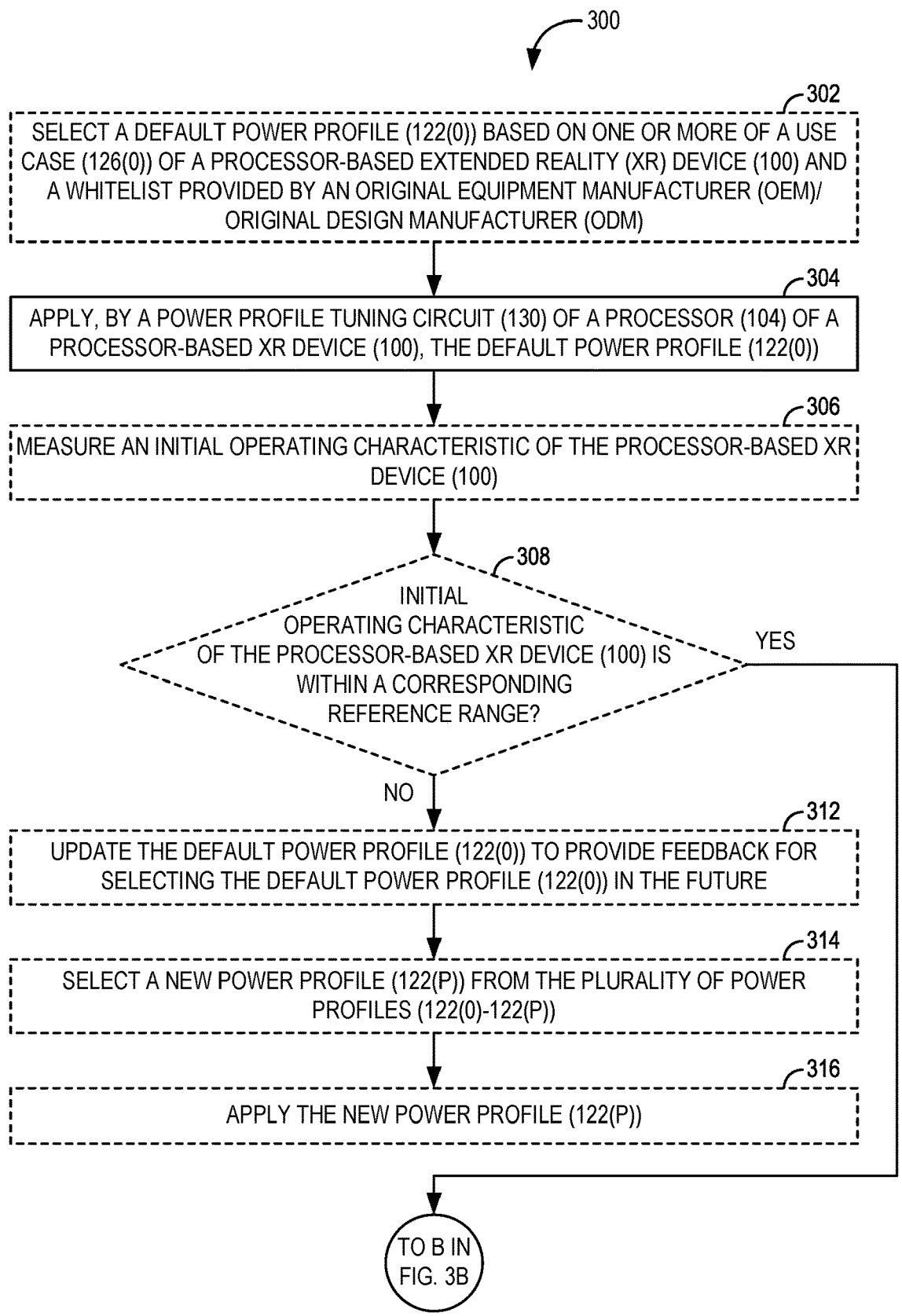
FIGS. 3A and 3B are flowcharts illustrating exemplary operations for providing runtime power profile tuning based on eye state, according to some aspects.
Figure 3B:
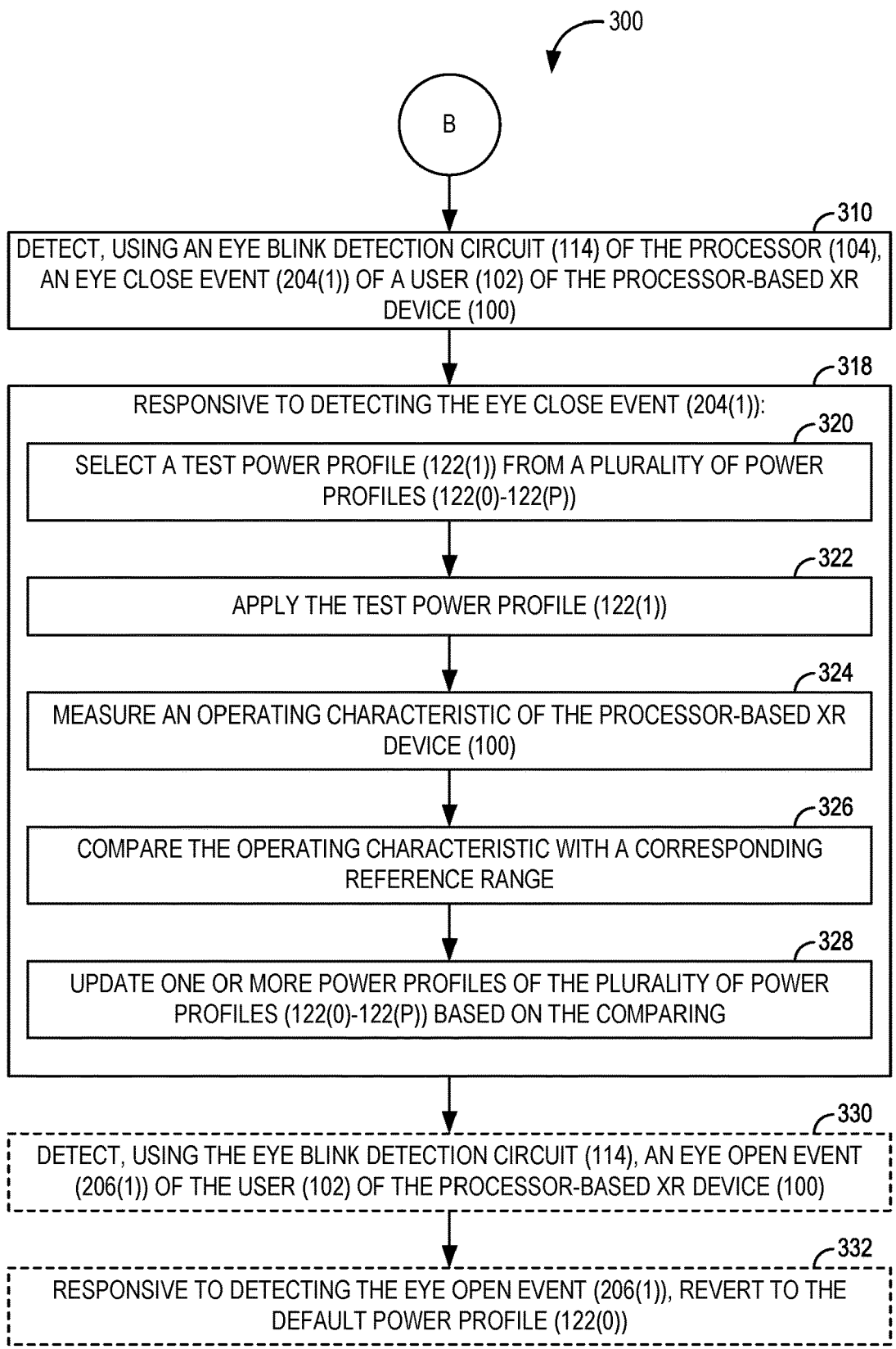

To illustrating exemplary operations for providing runtime power profile tuning based on eye state in the processor-based XR device 100 of FIG. 1, FIGS. 3A and 3B provide flowcharts illustrating exemplary operations 300. For the sake of clarity, elements of FIGS. 1 and 2 are referenced in describing FIGS. 3A and 3B. It is to be understood that some of the operations 300 shown in FIGS. 3A and 3B may be performed in an order other than that illustrated herein, and/or may be omitted. The operations 300 begin in FIG. 3A with the processor 104 in some aspects selecting a default power profile (e.g., the power profile 122(0) of FIG. 1) based on one or more of a use case (e.g., the use case 126(0) of FIG. 1) of the processor-based XR device 100 and a whitelist provided by an OEM/ODM (block 302). The processor 104 (e.g., using the power profile tuning circuit 130 of FIG. 1) applies the default power profile 122(0) (block 304).

According to some aspects, the processor 104 may measure an initial operating characteristic (e.g., an initial performance characteristic such as the performance characteristic 132 of FIG. 1, an initial power characteristic such as the power characteristic 134 of FIG. 1, and/or an initial temperature characteristic such as the temperature characteristic 136 of FIG. 1) of the processor-based XR device 100 (block 306). The processor 104 then determines whether the initial operating characteristic of the processor-based XR device 100 is within a corresponding reference range (e.g., the reference performance range 138, the reference power range 140, and/or the reference temperature range 142 of FIG. 1) (block 308). If so, processing continues at block 310 of FIG. 3B. If the initial operating characteristic is determined at decision block 308 to not be within the corresponding reference range, the processor 104 updates the default power profile 122(0) to provide feedback for selecting the default power profile 122(0) in the future (e.g., so the default power profile 122(0) will be selected less frequently) (block 312). The processor 104 next selects a new power profile (e.g., the power profile 122(P) of FIG. 1) from the plurality of power profiles 122(0)-122(P) (block 314). The processor 104 then applies the new power profile 122(P) (block 316). The operations 300 then continue at block 316 of FIG. 3B.

Turning now to FIG. 3B, the operations 300 continue with the processor 104 detecting, using an eye blink detection circuit (e.g., the eye blink detection circuit 114 of FIG. 1) of the processor 104, an eye close event (e.g., the eye close event 204(1) of FIG. 2) of a user (e.g., the user 102 of FIG. 1) of the processor-based XR device 100 (block 310). The processor 104 then performs a series of operations responsive to detecting the eye close event 204(1) (block 318). The processor 104 selects a test power profile (e.g., the power profile 122(1) of FIG. 1) from a plurality of power profiles (e.g., the profiles 122(0)-122(P) of FIG. 1) (block 320). The processor 104 then applies the test power profile 122(1) (block 322). The processor 104 measures an operating characteristic (e.g., the performance characteristic 132, the power characteristic 134, and/or the temperature characteristic 136 of FIG. 1) of the processor-based XR device 100 (block 324). The processor 104 compares the operating characteristic with a corresponding reference range (e.g., the reference performance range 138, the reference power range 140, and/or the reference temperature range 142 of FIG. 1) (block 326). The processor 104 then updates one or more power profiles of the plurality of power profiles 122(0)-122(P) based on the comparing (block 328). In some aspects, the processor 104 may subsequently detect, using the eye blink detection circuit 114, an eye open event (e.g., the eye open event 206(1) of FIG. 2) of the user 102 of the processor-based XR device 100 (block 330). In response to detecting the eye open event 206(1), the processor 104 may revert to the default power profile 122(0) (block 332).

Figure 4A:
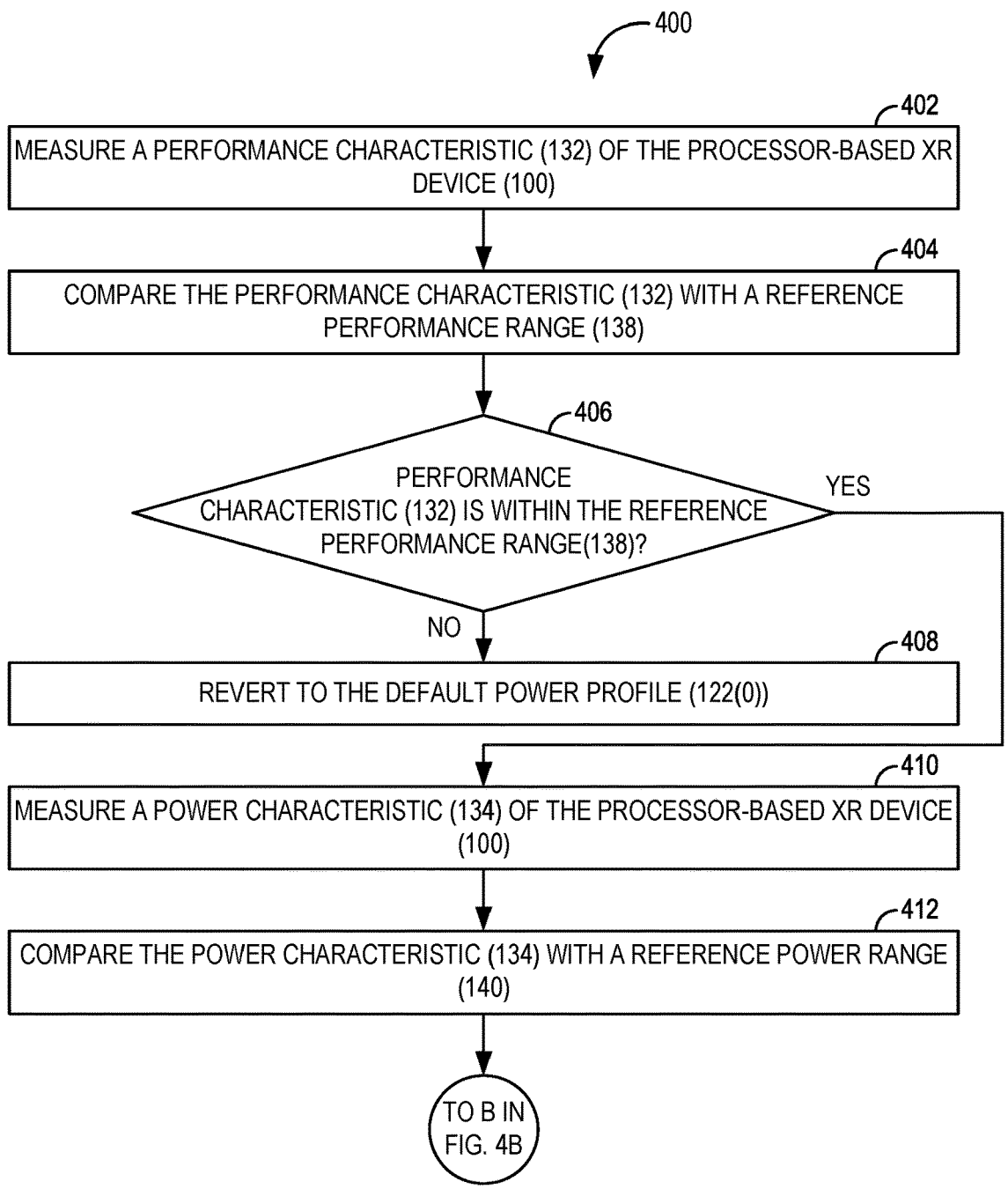
FIGS. 4A and 4B are flowcharts illustrating further exemplary operations for providing runtime power profile tuning further based on performance and power characteristics of the processor-based XR device when using a test power profile, according to some aspects.
Figure 4B:
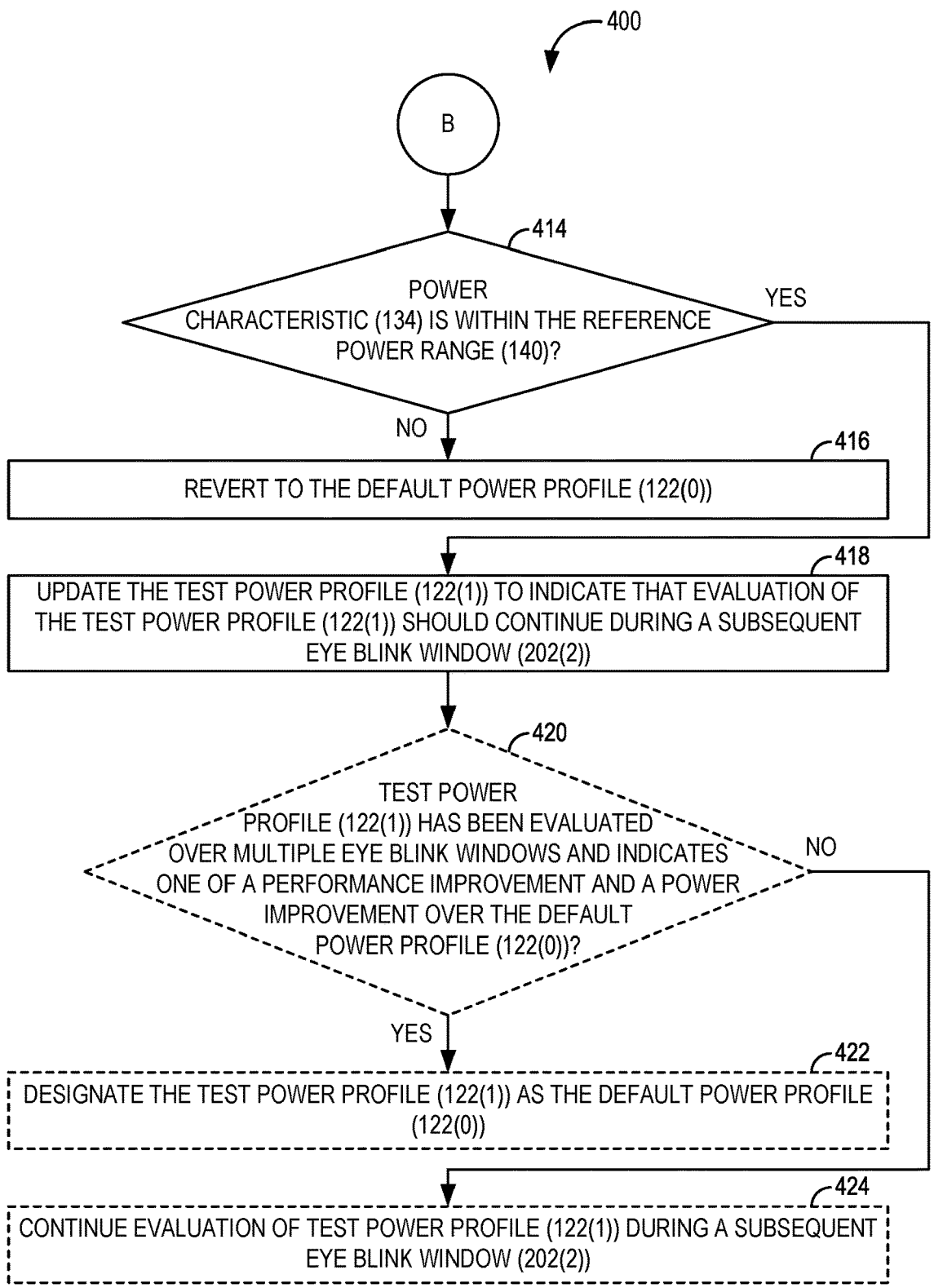

FIGS. 4A and 4B are flowcharts that illustrate exemplary operations 400 for providing runtime power profile tuning further based on performance and power characteristics of the processor-based XR device 100 when using a test power profile such as the power profile 122(1) of FIG. 1. Elements of FIGS. 1 and 2 are referenced in describing FIGS. 4A and 4B for the sake of clarity. In FIG. 4A, the operations 400 begin with the processor 104 (e.g., using the power profile tuning circuit 130 of FIG. 1) measuring a performance characteristic (e.g., the performance characteristic 132 of FIG. 1) of the processor-based XR device 100 (block 402). In this regard, the operations of block 402 of FIG. 4A correspond to the operations of block 324 of FIG. 3B for measuring an operating characteristic of the processor-based XR device 100 in some aspects. The processor 104 then compares the performance characteristic 132 with a reference performance range, such as the reference performance range 138 of FIG. 1 (block 404). The operations of block 404 of FIG. 4A thus correspond to the operations of block 326 of FIG. 3B for comparing the operating characteristic with a corresponding reference range, according to some aspects.

The processor 104 next determines whether the performance characteristic 132 is within the reference performance range 138 (block 406). If not, the processor 104 reverts to the default power profile 122(0) (block 408). However, if the processor 104 determines at decision block 406 that the performance characteristic 132 is within the reference performance range 138, the processor 104 measures a power characteristic (e.g., the power characteristic 134 of FIG. 1) of the processor-based XR device 100 (block 410). The processor 104 then compares the power characteristic 134 with a reference power range (e.g., the reference power range 140 of FIG. 1) (block 412). The operations 400 then continue at block 414 of FIG. 4B.

Referring now to FIG. 4B, the operations 400 continue with the processor 104 determining whether the power characteristic 134 is within the reference power range 140 (block 414). If not, the processor 104 reverts to the default power profile 122(0) (block 416). However, if the processor 104 determines at decision block 414 that the power characteristic 134 is within the reference power range 140, the processor 104 updates the test power profile 122(1) to indicate that evaluation of the test power profile 122(1) should continue during a subsequent eye blink window 202(2) (block 418). In this regard, the operations of blocks 406-418 of FIGS. 4A and 4B correspond to the operations of block 328 of FIG. 3B for updating one or more power profiles of the plurality of power profiles 122(0)-122(P) based on the comparing.

In some aspects, the processor 104 may also determine whether the test power profile 122(1) has been evaluated over multiple eye blink windows and indicates one of a performance improvement and a power improvement over the default power profile 122(0) (block 420). If so, the processor 104 designates the test power profile 122(1) as the default power profile 122(0) (block 422). If it is determined at decision block 420 that the test power profile 122(1) has not been evaluated over multiple eye blink windows or does not indicate a performance improvement or a power improvement over the default power profile 122(0), the processor 104 continues evaluation of test power profile 122(1) during a subsequent eye blink window 202(2) (block 424).

Figure 5:
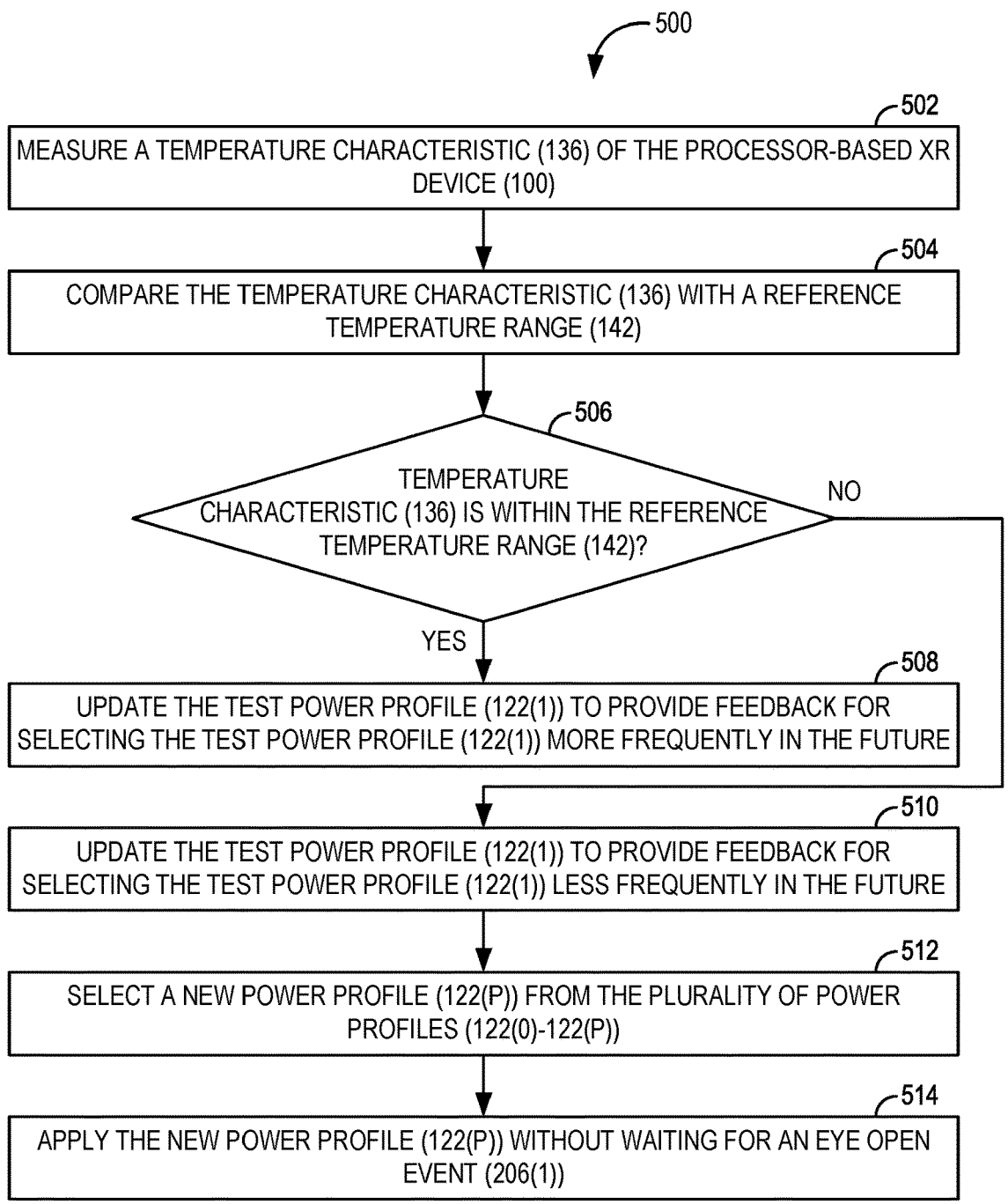
FIG. 5 is a flowchart illustrating exemplary operations for providing runtime power profile tuning further based on temperature characteristics of the processor-based XR device when using a test power profile, according to some aspects.

To illustrate exemplary operations for providing runtime power profile tuning further based on temperature characteristics of the processor-based XR device 100 of FIG. 1 when using a test power profile such as the power profile 122(1) of FIG. 1, FIG. 5 provides a flowchart showing exemplary operations 500. For the sake of clarity, elements of FIGS. 1 and 2 are referenced in describing FIG. 5. The operations 500 begin in FIG. 5A with the processor 104 of FIG. 1 (e.g., using the power profile tuning circuit 130 of FIG. 1) measuring a temperature characteristic (e.g., the temperature characteristic 136 of FIG. 1) of the processor-based XR device 100 (block 502). In this regard, the operations of block 502 of FIG. 5 correspond to the operations of block 324 of FIG. 3B for measuring an operating characteristic of the processor-based XR device 100 in some aspects. The processor 104 next compares the temperature characteristic 136 with a reference temperature range (e.g., the reference temperature range 142 of FIG. 1) (block 504). The operations of block 504 of FIG. 5 thus correspond to the operations of block 326 of FIG. 3B for comparing the operating characteristic with a corresponding reference range, according to some aspects.

The processor 104 then determines whether the temperature characteristic 136 is within the reference temperature range 142 (block 506). If so, the processor 104 updates the test power profile 122(1) to provide feedback for selecting the test power profile 122(1) more frequently in the future (block 508). However, if the processor 104 determines at decision block 506 that the temperature characteristic 136 is not within the reference temperature range 142, the processor 104 updates the test power profile 122(1) to provide feedback for selecting the test power profile 122(1) less frequently in the future (block 510). The processor 104 selects a new power profile (e.g., the power profile 122(P) of FIG. 1) from the plurality of power profiles 122(0)-122(P) (block 512). The processor 104 then applies the new power profile 122(P) without waiting for an eye open event (e.g., the eye open event 206(1) of FIG. 2) (block 514). In this regard, the operations of blocks 506-514 of FIG. 5 correspond to the operations of block 328 of FIG. 3B for updating one or more power profiles of the plurality of power profiles 122(0)-122(P) based on the comparing.

Providing runtime power profile tuning based on eye state according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 6:
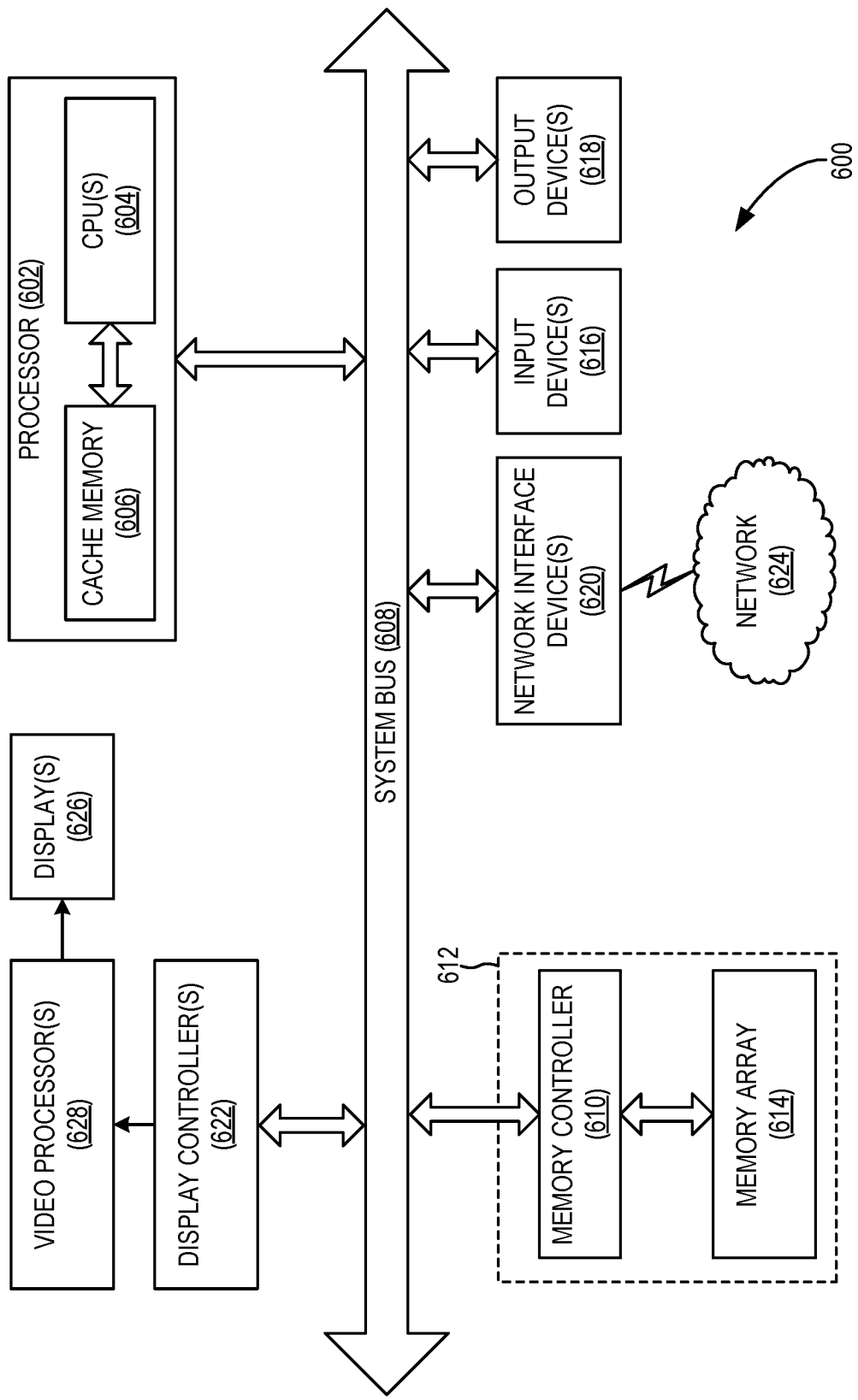
FIG. 6 is a block diagram of an exemplary processor-based device that can include the processor-based XR device of FIG. 1.

In this regard, FIG. 6 illustrates an example of a processor-based device 600 that may comprise the processor-based XR device 100 illustrated in FIG. 1. In this example, the processor-based device 600 includes a processor 602 that includes one or more central processing units (captioned as "CPUs" in FIG. 6) 604, which may also be referred to as CPU cores or processor cores. The processor 602 may have cache memory 606 coupled to the processor 602 for rapid access to temporarily stored data. The processor 602 is coupled to a system bus 608 and can intercouple master and slave devices included in the processor-based device 600. As is well known, the processor 602 communicates with these other devices by exchanging address, control, and data information over the system bus 608. For example, the processor 602 can communicate bus transaction requests to a memory controller 610, as an example of a slave device. Although not illustrated in FIG. 6, multiple system buses 608 could be provided, wherein each system bus 608 constitutes a different fabric.

Other master and slave devices can be connected to the system bus 608. As illustrated in FIG. 6, these devices can include a memory system 612 that includes the memory controller 610 and a memory array(s) 614, one or more input devices 616, one or more output devices 618, one or more network interface devices 620, and one or more display controllers 622, as examples. The input device(s) 616 can include any type of input device, including but not limited to input keys, switches, voice processors, etc. The output device(s) 618 can include any type of output device, including, but not limited to, audio, video, other visual indicators, etc. The network interface device(s) 620 can be any device configured to allow exchange of data to and from a network 624. The network 624 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 620 can be configured to support any type of communications protocol desired.

The processor 602 may also be configured to access the display controller(s) 622 over the system bus 608 to control information sent to one or more displays 626. The display controller(s) 622 sends information to the display(s) 626 to be displayed via one or more video processors 628, which process the information to be displayed into a format suitable for the display(s) 626. The display(s) 626 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A processor-based Extended Reality (XR) device, comprising:
   a processor; and
   an eye blink detection circuit communicatively coupled to the processor;
   the processor configured to:
   apply a default power profile;
   detect, using the eye blink detection circuit, an eye close event of a user of the processor-based XR device; and
   responsive to detecting the eye close event:
   select a test power profile from a plurality of power profiles;
   apply the test power profile;
   measure an operating characteristic of the processor-based XR device;
   compare the operating characteristic with a corresponding reference range; and
   update one or more power profiles of the plurality of power profiles based on the comparing.

2. The processor-based XR device of clause 1, wherein the processor is further configured to select the default power profile based on one or more of a use case of the processor-based XR device and a whitelist provided by an Original Equipment Manufacturer (OEM)/Original Design Manufacturer (ODM).

3. The processor-based XR device of any one of clauses 1-2, wherein the processor is further configured to:
   detect, using the eye blink detection circuit, an eye open event of the user of the processor-based XR device; and
   responsive to detecting the eye open event, revert to the default power profile.

4. The processor-based XR device of clause 3, wherein:
   the processor is configured to measure the operating characteristic of the processor-based XR device by being configured to measure a performance characteristic of the processor-based XR device;
   the processor is configured to compare the operating characteristic with the corresponding reference range by being configured to compare the performance characteristic with a reference performance range; and
   the processor is configured to update one or more power profiles of the plurality of power profiles based on the comparing by being configured to:
   determine whether the performance characteristic is within the reference performance range; and
   responsive to determining that the performance characteristic is within the reference performance range:
   measure a power characteristic of the processor-based XR device;
   compare the power characteristic with a reference power range;
   determine whether the power characteristic is within the reference power range; and
   responsive to determining that the power characteristic is within the reference power range and further responsive to detecting the eye open event, update the test power profile to indicate that evaluation of the test power profile should continue during a subsequent eye blink window.

5. The processor-based XR device of any one of clauses 3-4, wherein the processor is further configured to:
   determine whether the test power profile has been evaluated over multiple eye blink windows and indicates one of a performance improvement and a power improvement over the default power profile; and
   responsive to determining that the test power profile has been evaluated over multiple eye blink windows and indicates one of a performance improvement and a power improvement over the default power profile, designate the test power profile as the default power profile.

6. The processor-based XR device of any one of clauses 3-4, wherein the processor is further configured to, responsive to determining that the performance characteristic is not within the reference performance range and further responsive to detecting the eye open event, revert to the default power profile.

7. The processor-based XR device of any one of clauses 3-4, wherein the processor is further configured to, responsive to determining that the power characteristic is not within the reference power range and further responsive to detecting the eye open event, revert to the default power profile.

8. The processor-based XR device of any one of clauses 1-7, wherein:
the processor is configured to measure the operating characteristic of the processor-based XR device by being configured to measure a temperature characteristic of the processor-based XR device;
the processor is configured to compare the operating characteristic with the corresponding reference range by being configured to compare the temperature characteristic with a reference temperature range; and
the processor is configured to update one or more power profiles of the plurality of power profiles based on the comparing by being configured to:
determine whether the temperature characteristic is within the reference temperature range; and
responsive to determining that the temperature characteristic is not within the reference temperature range:
update the test power profile to provide feedback for selecting the test power profile less frequently in the future;
select a new power profile from the plurality of power profiles; and
apply the new power profile without waiting for an eye open event.

9. The processor-based XR device of any one of clauses 1-8, wherein the processor is further configured to, prior to applying the default power profile:
measure an initial operating characteristic of the processor-based XR device; and
determine whether the initial operating characteristic of the processor-based XR device is within the corresponding reference range;
wherein the processor is configured to detect the eye close event of the user of the processor-based XR device responsive to determining that the initial operating characteristic of the processor-based XR device is within the corresponding reference range.

10. The processor-based XR device of clause 9, wherein the processor is configured to determine whether the initial operating characteristic of the processor-based XR device is within the corresponding reference range by being configured to:
determine whether a performance characteristic is within a reference performance range;
determine whether a power characteristic is within a reference power range; and
determine whether a temperature characteristic is within a reference temperature range.

11. The processor-based XR device of any one of clauses 9-10, wherein the processor is further configured to, responsive to determining that the initial operating characteristic of the processor-based XR device is not within the corresponding reference range:
update the default power profile to provide feedback for selecting the default power profile less frequently in the future;
select a new power profile from the plurality of power profiles; and
apply the new power profile.

12. The processor-based XR device of any one of clauses 1-11, integrated into a device selected from the group consisting of: a set top box; an entertainment unit; a navigation device; a communications device; a fixed location data unit; a mobile location data unit; a global positioning system (GPS) device; a mobile phone; a cellular phone; a phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

13. A processor-based Extended Reality (XR) device, comprising:
means for applying a default power profile;
means for detecting an eye close event of a user of the processor-based XR device;
means for selecting a test power profile from a plurality of power profiles, responsive to detecting the eye close event;
means for applying the test power profile;
means for measuring an operating characteristic of the processor-based XR device;
means for comparing the operating characteristic with a corresponding reference range; and
means for updating one or more power profiles of the plurality of power profiles based on the comparing.

14. The processor-based XR device of clause 13, further comprising:
means for detecting an eye open event of the user of the processor-based XR device; and
means for reverting to the default power profile, responsive to detecting the eye open event.

15. The processor-based XR device of clause 14, wherein:
the means for measuring the operating characteristic of the processor-based XR device comprises means for measuring a performance characteristic of the processor-based XR device;
the means for comparing the operating characteristic with the corresponding reference range comprises means for comparing the performance characteristic with a reference performance range; and
the means for updating one or more power profiles of the plurality of power profiles based on the comparing comprises:
means for determining that the performance characteristic is within the reference performance range;
means for measuring a power characteristic of the processor-based XR device, responsive to determining that the performance characteristic is within the reference performance range;
means for comparing the power characteristic with a reference power range;
means for determining that the power characteristic is within the reference power range; and
means for updating the test power profile to indicate that evaluation of the test power profile should continue during a subsequent eye blink window, responsive to determining that the power characteristic is within the reference power range and further responsive to detecting the eye open event.

16. The processor-based XR device of clause 15, further comprising:
   means for determining that the test power profile has been evaluated over multiple eye blink windows and indicates one of a performance improvement and a power improvement over the default power profile; and
   means for designating the test power profile as the default power profile, responsive to determining that the test power profile has been evaluated over multiple eye blink windows and indicates one of a performance improvement and a power improvement over the default power profile.

17. The processor-based XR device of any one of clauses 15-16, further comprising:
   means for determining that the performance characteristic is not within the reference performance range; and
   means for reverting to the default power profile, responsive to determining that the performance characteristic is not within the reference performance range and further responsive to detecting the eye open event.

18. The processor-based XR device of any one of clauses 15-17, comprising:
   means for determining that the power characteristic is not within the reference power range; and
   means for reverting to the default power profile, responsive to determining that the power characteristic is not within the reference power range and further responsive to detecting the eye open event.

19. A method for providing runtime power profile tuning based on eye state, comprising:
   applying, by a power profile tuning circuit of a processor-based Extended Reality (XR) device, a default power profile;
   detecting, using an eye blink detection circuit of the processor-based XR device, an eye close event of a user of the processor-based XR device; and
   responsive to detecting the eye close event:
      selecting a test power profile from a plurality of power profiles;
      applying the test power profile;
      measuring an operating characteristic of the processor-based XR device;
      comparing the operating characteristic with a corresponding reference range; and
      updating one or more power profiles of the plurality of power profiles based on the comparing.

20. The method of clause 19, further comprising selecting the default power profile based on one or more of a use case of the processor-based XR device and a whitelist provided by an Original Equipment Manufacturer (OEM)/Original Design Manufacturer (ODM).

21. The method of any one of clauses 19-20, further comprising:
   detecting, using the eye blink detection circuit, an eye open event of the user of the processor-based XR device; and
   responsive to detecting the eye open event, reverting to the default power profile.

22. The method of clause 21, wherein:
   measuring the operating characteristic of the processor-based XR device comprises measuring a performance characteristic of the processor-based XR device;
   comparing the operating characteristic with the corresponding reference range comprises comparing the performance characteristic with a reference performance range; and
   updating one or more power profiles of the plurality of power profiles based on the comparing comprises:
      determining that the performance characteristic is within the reference performance range; and
      responsive to determining that the performance characteristic is within the reference performance range:
         measuring a power characteristic of the processor-based XR device;
         comparing the power characteristic with a reference power range;
         determining that the power characteristic is within the reference power range; and
         responsive to determining that the power characteristic is within the reference power range and further responsive to detecting the eye open event, updating the test power profile to indicate that evaluation of the test power profile should continue during a subsequent eye blink window.

23. The method of clause 22, further comprising:
   determining that the test power profile has been evaluated over multiple eye blink windows and indicates one of a performance improvement and a power improvement over the default power profile; and
   responsive to determining that the test power profile has been evaluated over multiple eye blink windows and indicates one of a performance improvement and a power improvement over the default power profile, designating the test power profile as the default power profile.

24. The method of any one of clauses 21-23, wherein:
   measuring the operating characteristic of the processor-based XR device comprises measuring a performance characteristic of the processor-based XR device;
   comparing the operating characteristic with the corresponding reference range comprises comparing the performance characteristic with a reference performance range; and
   updating one or more power profiles of the plurality of power profiles based on the comparing comprises:
      determining that the performance characteristic is not within the reference performance range; and
      responsive to determining that the performance characteristic is not within the reference performance range and further responsive to detecting the eye open event, reverting to the default power profile.

25. The method of any one of clauses 21-24, wherein:
   measuring the operating characteristic of the processor-based XR device comprises measuring a performance characteristic of the processor-based XR device;
   comparing the operating characteristic with the corresponding reference range comprises comparing the performance characteristic with a reference performance range; and
   updating one or more power profiles of the plurality of power profiles based on the comparing comprises:
      determining that the performance characteristic is within the reference performance range;
      responsive to determining that the performance characteristic is within the reference performance range:
         measuring a power characteristic of the processor-based XR device;
         comparing the power characteristic with a reference power range;

determining that the power characteristic is not within the reference power range; and responsive to determining that the power characteristic is not within the reference power range and further responsive to detecting the eye open event, reverting to the default power profile.

26. The method of any one of clauses 19-25, wherein:

measuring the operating characteristic of the processor-based XR device comprises measuring a temperature characteristic of the processor-based XR device;

comparing the operating characteristic with the corresponding reference range comprises comparing the temperature characteristic with a reference temperature range; and updating one or more power profiles of the plurality of power profiles based on the comparing comprises:
  determining that the temperature characteristic is not within the reference temperature range; and
  responsive to determining that the temperature characteristic is not within the reference temperature range:
    updating the test power profile to provide feedback for selecting the test power profile less frequently in the future;
    selecting a new power profile from the plurality of power profiles; and
    applying the new power profile without waiting for an eye open event.

27. The method of any one of clauses 19-26, further comprising, prior to applying the default power profile:

measuring an initial operating characteristic of the processor-based XR device; and determining that the initial operating characteristic of the processor-based XR device is within the corresponding reference range;

wherein detecting the eye close event of the user of the processor-based XR device is responsive to determining that the initial operating characteristic of the processor-based XR device is within the corresponding reference range.

28. The method of clause 27, wherein determining that the initial operating characteristic of the processor-based XR device is within the corresponding reference range comprises:

determining that a performance characteristic is within a reference performance range;

determining that a power characteristic is within a reference power range; and determining that a temperature characteristic is within a reference temperature range.

29. The method of any one of clauses 19-28, further comprising, prior to applying the default power profile:

measuring an initial operating characteristic of the processor-based XR device;

determining that the initial operating characteristic of the processor-based XR device is not within the corresponding reference range; and responsive to determining that the initial operating characteristic of the processor-based XR device is not within the corresponding reference range:
  updating the default power profile to provide feedback for selecting the default power profile less frequently in the future;
  selecting a new power profile from the plurality of power profiles; and
  applying the new power profile.

30. A non-transitory computer-readable medium having stored thereon computer-executable instructions that, when executed, cause a processor of a processor-based Extended Reality (XR) device to:

apply a default power profile;

detect an eye close event of a user of the processor-based XR device; and responsive to detecting the eye close event:
  select a test power profile from a plurality of power profiles;
  apply the test power profile;
  measure an operating characteristic of the processor-based XR device;
  compare the operating characteristic with a corresponding reference range; and
  update one or more power profiles of the plurality of power profiles based on the comparing.

What is claimed is:

1. A processor-based Extended Reality (XR) device, comprising:

a processor; and an eye blink detection circuit communicatively coupled to the processor;

the processor configured to:
  apply a default power profile;
  detect, using the eye blink detection circuit, an eye close event of a user of the processor-based XR device indicating a start of an eye blink window having a duration of no more than 400 milliseconds; and
  responsive to detecting the eye close event and during the eye blink window:
    select a test power profile from a plurality of power profiles;
    apply the test power profile;
    measure an operating characteristic of the processor-based XR device;
    compare the operating characteristic with a corresponding reference range; and
    update the test power profile based on the comparing;
  wherein each power profile of the plurality of power profiles specifies one or more of a system setting, an option, and an attribute affecting power usage of the processor-based XR device.

2. The processor-based XR device of claim 1, wherein the processor is further configured to select the default power profile based on one or more of a use case of the processor-based XR device and a whitelist provided by an Original Equipment Manufacturer (OEM)/Original Design Manufacturer (ODM).

3. The processor-based XR device of claim 1, wherein the processor is further configured to:

detect, using the eye blink detection circuit, an eye open event of the user of the processor-based XR device indicating an end of the eye blink window; and responsive to detecting the eye open event, revert to the default power profile.

4. The processor-based XR device of claim 3, wherein:

the processor is configured to measure the operating characteristic of the processor-based XR device by being configured to measure a performance characteristic of the processor-based XR device;

the processor is configured to compare the operating characteristic with the corresponding reference range by being configured to compare the performance characteristic with a reference performance range; and the processor is configured to update the test power profile based on the comparing by being configured to:
  determine whether the performance characteristic is within the reference performance range; and
  responsive to determining that the performance characteristic is within the reference performance range:
    measure a power characteristic of the processor-based XR device;
    compare the power characteristic with a reference power range;
    determine whether the power characteristic is within the reference power range; and
    responsive to determining that the power characteristic is within the reference power range and further responsive to detecting the eye open event, update the test power profile to indicate that evaluation of the test power profile should continue during a subsequent eye blink window.

5. The processor-based XR device of claim 4, wherein the processor is further configured to:
  determine whether the test power profile has been evaluated over multiple eye blink windows and indicates one of a performance improvement and a power improvement over the default power profile; and
  responsive to determining that the test power profile has been evaluated over multiple eye blink windows and indicates one of a performance improvement and a power improvement over the default power profile, designate the test power profile as the default power profile.

6. The processor-based XR device of claim 4, wherein the processor is further configured to, responsive to determining that the performance characteristic is not within the reference performance range and further responsive to detecting the eye open event, revert to the default power profile.

7. The processor-based XR device of claim 4, wherein the processor is further configured to, responsive to determining that the power characteristic is not within the reference power range and further responsive to detecting the eye open event, revert to the default power profile.

8. The processor-based XR device of claim 1, wherein:
  the processor is configured to measure the operating characteristic of the processor-based XR device by being configured to measure a temperature characteristic of the processor-based XR device;
  the processor is configured to compare the operating characteristic with the corresponding reference range by being configured to compare the temperature characteristic with a reference temperature range; and
  the processor is configured to update the test power profile based on the comparing by being configured to:
    determine whether the temperature characteristic is within the reference temperature range; and
    responsive to determining that the temperature characteristic is not within the reference temperature range:
      update the test power profile to provide feedback for selecting the test power profile less frequently in the future;
      select a new power profile from the plurality of power profiles; and
      apply the new power profile without waiting for an eye open event.

9. The processor-based XR device of claim 1, wherein the processor is further configured to, prior to applying the default power profile:
  measure an initial operating characteristic of the processor-based XR device; and
  determine whether the initial operating characteristic of the processor-based XR device is within the corresponding reference range;
  wherein the processor is configured to detect the eye close event of the user of the processor-based XR device responsive to determining that the initial operating characteristic of the processor-based XR device is within the corresponding reference range.

10. The processor-based XR device of claim 9, wherein the processor is configured to determine whether the initial operating characteristic of the processor-based XR device is within the corresponding reference range by being configured to:
  determine whether a performance characteristic is within a reference performance range;
  determine whether a power characteristic is within a reference power range; and
  determine whether a temperature characteristic is within a reference temperature range.

11. The processor-based XR device of claim 9, wherein the processor is further configured to, responsive to determining that the initial operating characteristic of the processor-based XR device is not within the corresponding reference range:
  update the default power profile to provide feedback for selecting the default power profile less frequently in the future;
  select a new power profile from the plurality of power profiles; and
  apply the new power profile.

12. The processor-based XR device of claim 1, integrated into a device selected from the group consisting of: a set top box; an entertainment unit; a navigation device; a communications device; a fixed location data unit; a mobile location data unit; a global positioning system (GPS) device; a mobile phone; a cellular phone; a phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

13. A processor-based Extended Reality (XR) device, comprising:
  means for applying a default power profile;
  means for detecting an eye close event of a user of the processor-based XR device indicating a start of an eye blink window having a duration of no more than 400 milliseconds;
  means for selecting a test power profile from a plurality of power profiles, responsive to detecting the eye close event and during the eye blink window;
  means for applying the test power profile;
  means for measuring an operating characteristic of the processor-based XR device;
  means for comparing the operating characteristic with a corresponding reference range; and
  means for updating the test power profile based on the comparing;
  wherein each power profile of the plurality of power profiles specifies one or more of a system setting, an option, and an attribute affecting power usage of the processor-based XR device.

14. The processor-based XR device of claim 13, further comprising:
    means for detecting an eye open event of the user of the processor-based XR device indicating an end of the eye blink window; and
    means for reverting to the default power profile, responsive to detecting the eye open event.

15. The processor-based XR device of claim 14, wherein:
    the means for measuring the operating characteristic of the processor-based XR device comprises means for measuring a performance characteristic of the processor-based XR device;
    the means for comparing the operating characteristic with the corresponding reference range comprises means for comparing the performance characteristic with a reference performance range; and
    the means for updating the test power profile based on the comparing comprises:
        means for determining that the performance characteristic is within the reference performance range;
        means for measuring a power characteristic of the processor-based XR device, responsive to determining that the performance characteristic is within the reference performance range;
        means for comparing the power characteristic with a reference power range;
        means for determining that the power characteristic is within the reference power range; and
        means for updating the test power profile to indicate that evaluation of the test power profile should continue during a subsequent eye blink window, responsive to determining that the power characteristic is within the reference power range and further responsive to detecting the eye open event.

16. The processor-based XR device of claim 15, further comprising:
    means for determining that the test power profile has been evaluated over multiple eye blink windows and indicates one of a performance improvement and a power improvement over the default power profile; and
    means for designating the test power profile as the default power profile, responsive to determining that the test power profile has been evaluated over multiple eye blink windows and indicates one of a performance improvement and a power improvement over the default power profile.

17. The processor-based XR device of claim 15, further comprising:
    means for determining that the performance characteristic is not within the reference performance range; and
    means for reverting to the default power profile, responsive to determining that the performance characteristic is not within the reference performance range and further responsive to detecting the eye open event.

18. The processor-based XR device of claim 15, comprising:
    means for determining that the power characteristic is not within the reference power range; and
    means for reverting to the default power profile, responsive to determining that the power characteristic is not within the reference power range and further responsive to detecting the eye open event.

19. A method for providing runtime power profile tuning based on eye state, comprising:
    applying, by a power profile tuning circuit of a processor-based Extended Reality (XR) device, a default power profile;
    detecting, using an eye blink detection circuit of the processor-based XR device, an eye close event of a user of the processor-based XR device indicating a start of an eye blink window having a duration of no more than 400 milliseconds; and
    responsive to detecting the eye close event and during the eye blink window:
        selecting a test power profile from a plurality of power profiles;
        applying the test power profile;
        measuring an operating characteristic of the processor-based XR device;
        comparing the operating characteristic with a corresponding reference range; and
        updating the test power profile based on the comparing;
    wherein each power profile of the plurality of power profiles specifies one or more of a system setting, an option, and an attribute affecting power usage of the processor-based XR device.

20. The method of claim 19, further comprising selecting the default power profile based on one or more of a use case of the processor-based XR device and a whitelist provided by an Original Equipment Manufacturer (OEM)/Original Design Manufacturer (ODM).

21. The method of claim 19, further comprising:
    detecting, using the eye blink detection circuit, an eye open event of the user of the processor-based XR device indicating an end of the eye blink window; and
    responsive to detecting the eye open event, reverting to the default power profile.

22. The method of claim 21, wherein:
    measuring the operating characteristic of the processor-based XR device comprises measuring a performance characteristic of the processor-based XR device;
    comparing the operating characteristic with the corresponding reference range comprises comparing the performance characteristic with a reference performance range; and
    updating the test power profile based on the comparing comprises:
        determining that the performance characteristic is within the reference performance range; and
        responsive to determining that the performance characteristic is within the reference performance range:
            measuring a power characteristic of the processor-based XR device;
            comparing the power characteristic with a reference power range;
            determining that the power characteristic is within the reference power range; and
            responsive to determining that the power characteristic is within the reference power range and further responsive to detecting the eye open event, updating the test power profile to indicate that evaluation of the test power profile should continue during a subsequent eye blink window.

23. The method of claim 22, further comprising:
    determining that the test power profile has been evaluated over multiple eye blink windows and indicates one of a performance improvement and a power improvement over the default power profile; and
    responsive to determining that the test power profile has been evaluated over multiple eye blink windows and indicates one of a performance improvement and a power improvement over the default power profile, designating the test power profile as the default power profile.

24. The method of claim 21, wherein:
measuring the operating characteristic of the processor-based XR device comprises measuring a performance characteristic of the processor-based XR device;
comparing the operating characteristic with the corresponding reference range comprises comparing the performance characteristic with a reference performance range; and
updating the test power profile based on the comparing comprises:
determining that the performance characteristic is not within the reference performance range; and
responsive to determining that the performance characteristic is not within the reference performance range and further responsive to detecting the eye open event, reverting to the default power profile.

25. The method of claim 21, wherein:
measuring the operating characteristic of the processor-based XR device comprises measuring a performance characteristic of the processor-based XR device;
comparing the operating characteristic with the corresponding reference range comprises comparing the performance characteristic with a reference performance range; and
updating the test power profile based on the comparing comprises:
determining that the performance characteristic is within the reference performance range;
responsive to determining that the performance characteristic is within the reference performance range:
measuring a power characteristic of the processor-based XR device;
comparing the power characteristic with a reference power range;
determining that the power characteristic is not within the reference power range; and
responsive to determining that the power characteristic is not within the reference power range and further responsive to detecting the eye open event, reverting to the default power profile.

26. The method of claim 19, wherein:
measuring the operating characteristic of the processor-based XR device comprises measuring a temperature characteristic of the processor-based XR device;
comparing the operating characteristic with the corresponding reference range comprises comparing the temperature characteristic with a reference temperature range; and
updating the test power profile based on the comparing comprises:
determining that the temperature characteristic is not within the reference temperature range; and
responsive to determining that the temperature characteristic is not within the reference temperature range:
updating the test power profile to provide feedback for selecting the test power profile less frequently in the future;
selecting a new power profile from the plurality of power profiles; and
applying the new power profile without waiting for an eye open event.

27. The method of claim 19, further comprising, prior to applying the default power profile:
measuring an initial operating characteristic of the processor-based XR device; and
determining that the initial operating characteristic of the processor-based XR device is within the corresponding reference range;
wherein detecting the eye close event of the user of the processor-based XR device is responsive to determining that the initial operating characteristic of the processor-based XR device is within the corresponding reference range.

28. The method of claim 27, wherein determining that the initial operating characteristic of the processor-based XR device is within the corresponding reference range comprises:
determining that a performance characteristic is within a reference performance range;
determining that a power characteristic is within a reference power range; and
determining that a temperature characteristic is within a reference temperature range.

29. The method of claim 19, further comprising, prior to applying the default power profile:
measuring an initial operating characteristic of the processor-based XR device;
determining that the initial operating characteristic of the processor-based XR device is not within the corresponding reference range; and
responsive to determining that the initial operating characteristic of the processor-based XR device is not within the corresponding reference range:
updating the default power profile to provide feedback for selecting the default power profile less frequently in the future;
selecting a new power profile from the plurality of power profiles; and
applying the new power profile.

30. A non-transitory computer-readable medium having stored thereon computer-executable instructions that, when executed, cause a processor of a processor-based Extended Reality (XR) device to:
apply a default power profile;
detect an eye close event of a user of the processor-based XR device indicating a start of an eye blink window having a duration of no more than 400 milliseconds; and
responsive to detecting the eye close event and during the eye blink window:
select a test power profile from a plurality of power profiles;
apply the test power profile;
measure an operating characteristic of the processor-based XR device;
compare the operating characteristic with a corresponding reference range; and
update the test power profile based on the comparing;
wherein each power profile of the plurality of power profiles specifies one or more of a system setting, an option, and an attribute affecting power usage of the processor-based XR device.

* * * * *